United States Patent
Althaus

[15] 3,647,270
[45] Mar. 7, 1972

[54] HYDRAULIC CHAIN-TENSIONING DEVICE, ESPECIALLY FOR TRACKLAYING VEHICLES

[72] Inventor: Ernst Althaus, Dortmund-Kirchhorde, Germany
[73] Assignee: Orenstein & Koppel Aktiengesellschaft, Berlin, Germany
[22] Filed: Nov. 12, 1969
[21] Appl. No.: 875,870

[30] Foreign Application Priority Data
Nov. 13, 1968  Germany..................P 18 08 528.4

[52] U.S. Cl............................................305/10, 74/242.14
[51] Int. Cl...........................................................B62d 55/30
[58] Field of Search................................305/10; 74/242.14

[56] References Cited

UNITED STATES PATENTS 2,818,311   12/1957   Ashley......................................305/10
2,837,378   6/1958    Williams...................................305/10
3,082,043   3/1963    Orton.......................................305/10
3,549,213   12/1970   Smith.......................................305/10

OTHER PUBLICATIONS

German Printed Application No. 1,158,379 Jan., 1961

Primary Examiner—Richard J. Johnson
Attorney—Walter Becker

[57] ABSTRACT

A hydraulic chain-tensioning device for tracklaying vehicles, in which the chain tension controlling wheel is carried by a reciprocable slide operable by a hydraulically operable cylinder-piston system in association with a fluid accumulator through the intervention of a pushrod interposed between said cylinder piston system and said slide while yieldable spring means surrounding said pushrod are interposed between said cylinder-piston means and said slide.

6 Claims, 3 Drawing Figures

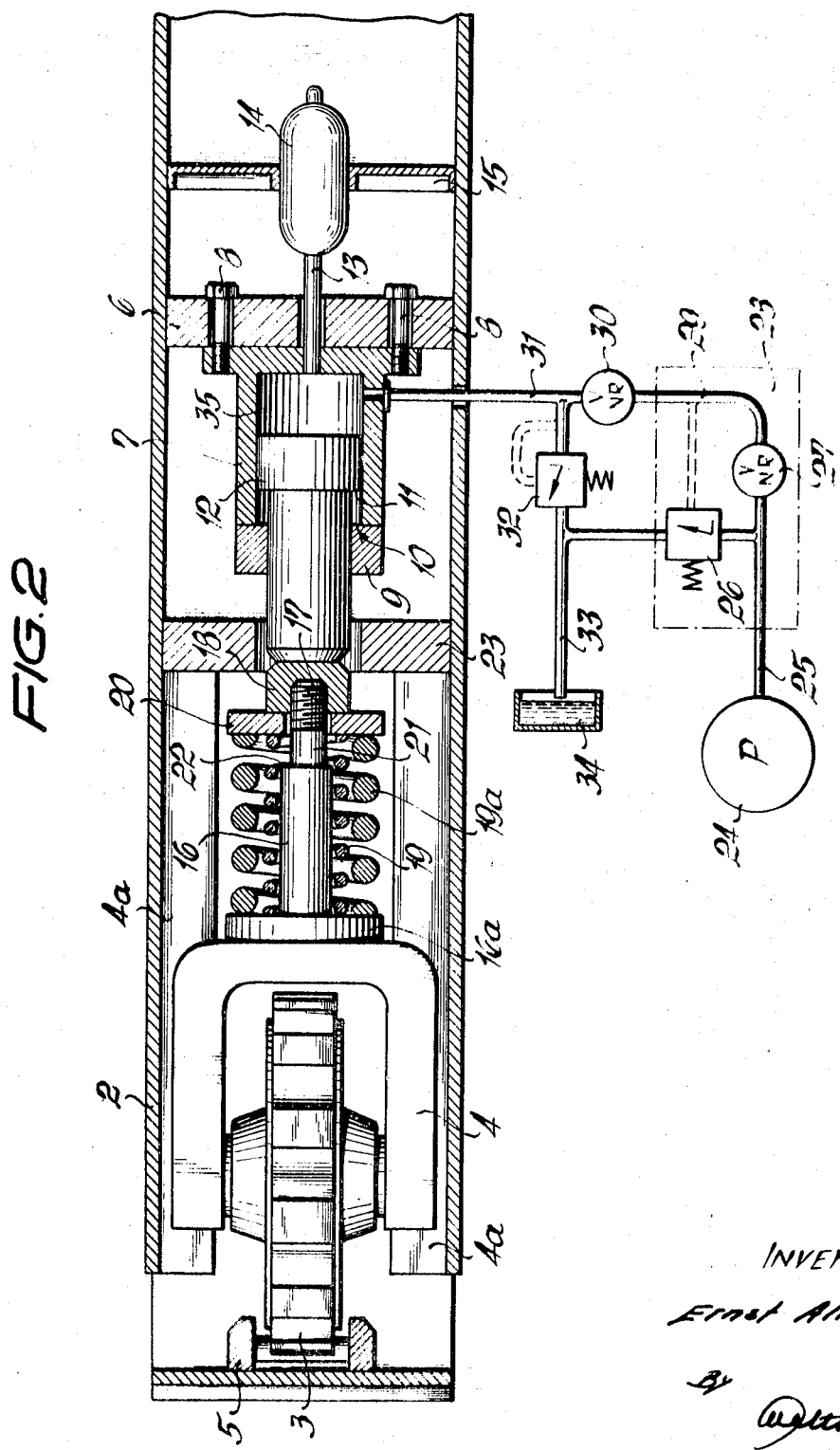

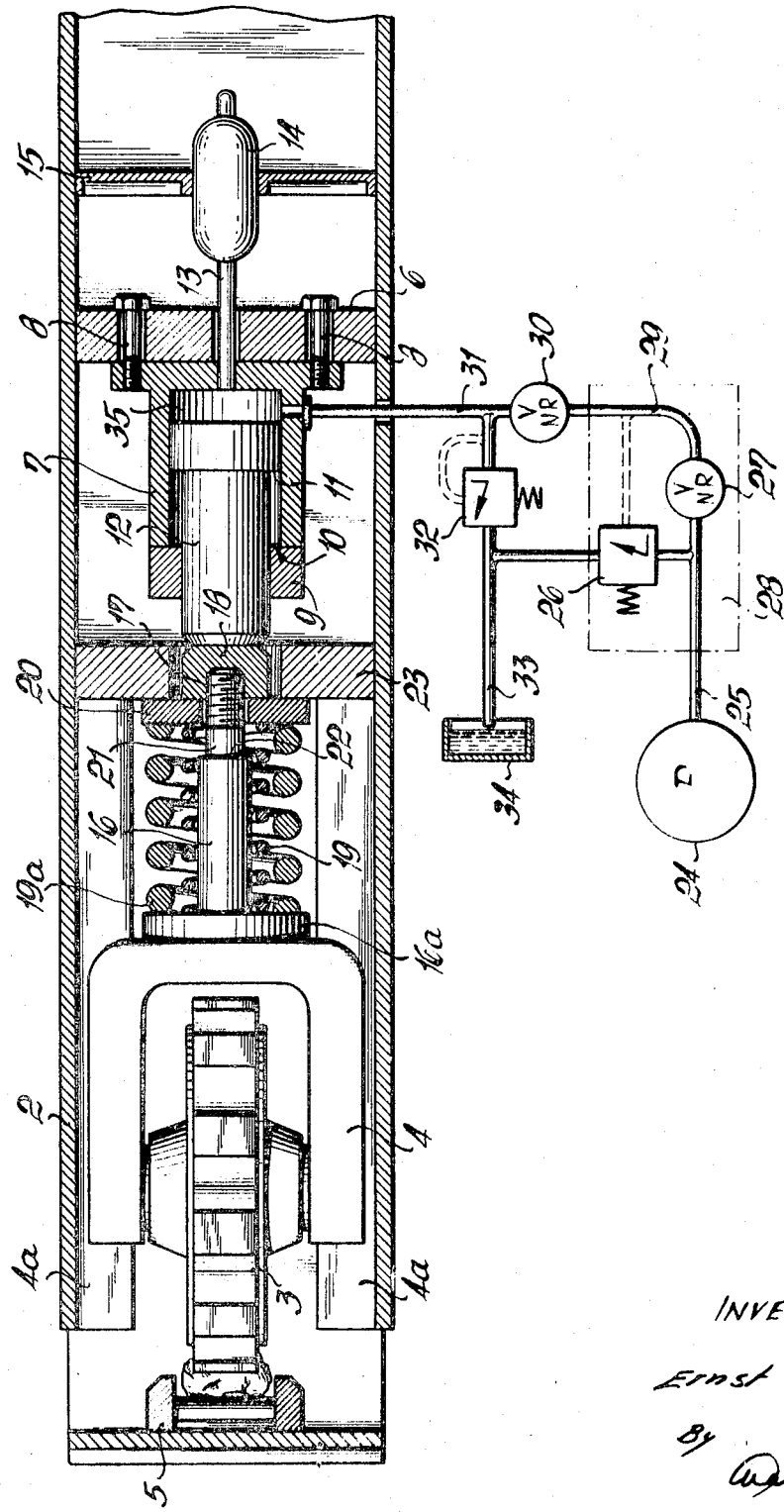

3,647,270

HYDRAULIC CHAIN-TENSIONING DEVICE, ESPECIALLY FOR TRACKLAYING VEHICLES

The present invention relates to a hydraulic chain tensioning device, especially for tracklaying vehicles, with a pressure bar which is connected to the guide wheel, acts upon a piston movable in a cylinder, and is equipped with a spring cooperating with said cylinder.

According to a heretofore known chain tensioning device, a hydraulic cylinder piston system and an accumulator are supplied with pressure fluid by a pump which is operatively connected to the carriage, until the pressure necessary for tensioning the chain has been established. As soon as the pressure drops in the cylinder in view of a slackening of the chain, the check valve provided in the accumulator opens up, and the oil under pressure flowing out of the accumulator restores the pressure in the cylinder to the necessary extent required for the tensioning of the chain. In addition to the hydraulic tensioning device there is furthermore provided a spring tensioning device for compensating the wear of the chain. This spring tensioning device becomes effective when a foreign body gets stuck between the chain of the chain drive and/or the guide wheel. In view of the pressure increasing in the cylinder as a result of such foreign body entering the space between the chain and the chain drive wheel or guide wheel, the check valve is closed so that the hydraulic system becomes rigid and the spring system becomes effective or operable. Such a device, however, is provided primarily for the purpose of compensating for the lengthening of the chain due to wear or in other words in order to keep the chain uniformly tensioned. Overloads acting on the track chain are absorbed only by springs. In view of the limited spring stroke and the necessary pretensioning force, only relatively low forces can be absorbed so that such a device is not feasible for heavy implements.

Another heretofore known tracklaying vehicle is provided with a device for tensioning the chains, which device likewise operates by means of a hydraulic cylinder, an accumulator, and a spring. By means of the hydraulic cylinder subjected to pressure, a spring is pretensioned which brings about the tensioning of the chain drive. The hydraulic cylinder communicates with an accumulator. The spring arranged in front of the piston is pretensioned simultaneously with the displacement of the guide wheel toward the chain. In view of the pretensioning, the major portion of the available spring stroke is lost so that the spring already in this way is limited. When a foreign body gets stuck between the chain and the drive wheel or the guide wheel, first the spring responds and only then the hydraulic accumulator responds. Since with such an arrangement, due to the pretensioning, a portion of the spring stroke becomes lost and the end pressure in the hydraulic accumulator reaches a very high value, these parts, essential for the function of the chain-tensioning device, would with large tracklaying vehicles, be of such dimensions that the place requirement of the chain-tensioning device would be in a completely unrealistic relationship to the driving mechanism or carriage.

It is, therefore, an object of the present invention to provide a chain tensioning device which will also be suitable for extremely high loads with heavy tracklaying vehicles, but will nevertheless have such a low space requirement that the entire device can be mounted within the drive for the track chain between the guide wheel and the drive.

These and other objects and advantages of the invention will appear more clearly from the following specification, in connection with the accompanying drawings, in which:

FIG. 2 is a longitudinal section taken along the line I—I of FIG. 1 in its starting condition with the chain in tensioned condition.

FIG. 3 is a longitudinal section similar to that of FIG. 2, but showing the elements in a displaced condition brought about by the accumulation of foreign matter in the tooth spaces.

Figure 1:
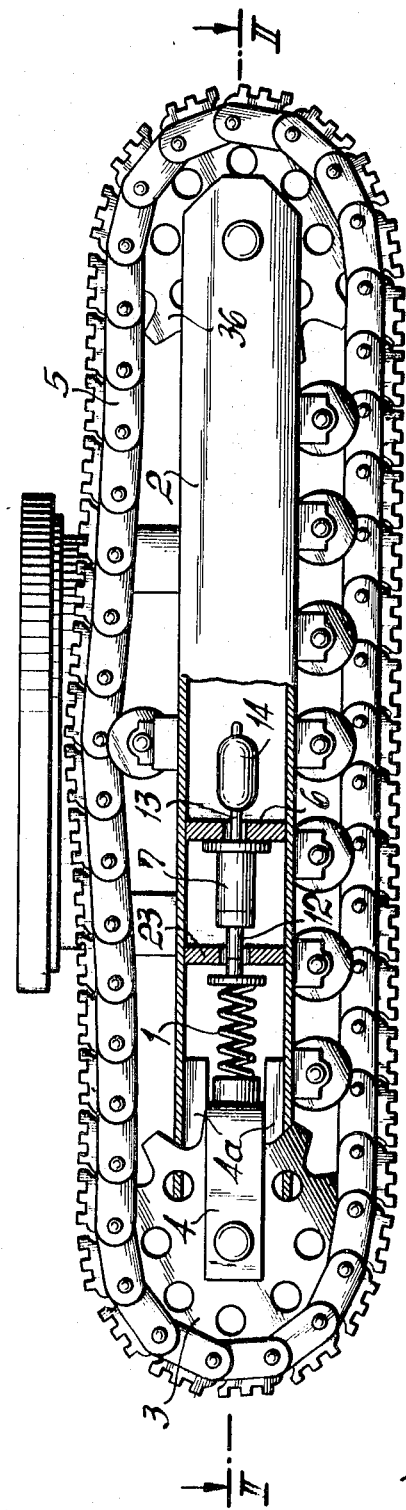
FIG. 1 is a side view of a chain tensioning device according to the invention and illustrates the same in installed condition in a tracklaying vehicle.

The present invention is based on the finding that the limitation heretofore encountered of the forces to be absorbed is due to mechanical preloaded springs and their association to the hydraulic system, whereas the devices provided for the hydraulic spring are not fully taken advantage of.

The present invention is characterized primarily in that between the guide wheel and the tensioning piston there is provided a nonpreloaded spring and that the pressure bar will, under load, act directly against the piston while the spring surrounding the pressure bar engages an abutment which is displaceable on the pressure bar and serves as spring dish. This displaceable abutment cooperates with a fixed abutment in the housing. The invention is furthermore characterized in that the cylinder chamber cooperates with the pressure accumulator communicating with said cylinder chamber, until a pressure is obtained which is limited by a pressure-limiting valve.

The tensioning device according to the present invention is in conformity with a further development of the invention built into the entire hydraulic circuit in such a way that the pressure medium is conveyed by a pump through a control valve system comprising pressure-limiting and check valve means, and through a check valve designed as a filling valve, is passed simultaneously into the hydraulic accumulator and into the cylinder chamber communicating with said hydraulic accumulator through a conduit.

Referring now to the drawings in detail, FIG. 1 shows the installation of a chain tensioning device 1 in the hollow profile frame 2 of a tracklaying vehicle. At one end of the hollow profile frame 2, the guide wheel 3 is by means of a slide member 4 displaceably mounted on guide rails 4a for movement in longitudinal direction so that the chain 5 can be pretensioned in case of wear and that no undue stresses will occur in the driving mechanism if a stone or other foreign matter accumulates between the guide wheel 3 or drive wheel 36 on one hand and chain 5 on the other hand. The hydraulic cylinder 7 is, by means of screws 8, connected to the transverse traverse 6 of the frame 2. The hydraulic cylinder 7 is provided with a detachable cover 9, the extension 10 of which prevents the piston 12 which is likewise provided with an extension 11 from sliding out of the cylinder when the piston 12 reaches its end stroke. The cylinder is, by means of the conduit 13 screwed onto the hydraulic cylinder 7, in communication with the hydraulic accumulator 14 mounted on the traverse 15. The pressure bar 16 is screwed to the sliding member 4. The free end of the pressure bar 16 is provided with a thread 17 having screwed thereonto a capnut 18. Coaxially arranged around the pressure bar 16 are two springs 19, 19a which on one hand rest against the dish 16a which forms a single piece with the pressure bar 16 and on the other hand rests against the displaceable spring dish 20. To this end, the pressure bar 18 is provided with a reduced section 21 on which the spring dish 20 may slide between the capnut 18 and the extension 22. In frame 2 there is fixedly arranged an abutment 23.

Pump 24 which forms a portion of the hydraulic system of the track laying vehicle conveys oil under pressure through conduit 25, the control valve 28 which comprises the pressure limiting valve 26 and the check valve 27, conduit 29, a check valve 30 forming a filling valve, and conduit 31 into the cylinder chamber 35 of the hydraulic cylinder 7 from where the oil under pressure passes into the conduit 13 and into the hydraulic accumulator 14. When, in view of outer influence, the piston 12 moves in the direction toward the accumulator, the oil under pressure is displaced through conduit 31 and conduit 13, closes the check valve 30, passes into the hydraulic accumulator 14 and opens the pressure limiting valve 32. From here the oil under pressure passes through conduit 33 to the pressure oil container 34.

OPERATION

FIG. 2 shows the starting condition of the system with the chain 5 of the tracklaying vehicle in tensioned condition. The pump 24 which furnishes a constant pressure delivers oil under pressure through the check valves 27 and 30 simultaneously to the hydraulic accumulator 14 and the cylinder chamber 35 of the hydraulic cylinder 7 until the desired tensioning pressure of the chain has been obtained. When this pressure has been obtained, it will also react on, and more specifically, the pressure in line 29 will through line 28a act upon pressure limiting valve 26 so as to open the same with the result that the delivery of pump 24 is freely circulated to reservoir 34 and from there withdrawn by pump 24.

If during the movement of the vehicle a foreign body for instance a pebble gets stuck between the guide wheel and the chain 5, the guide wheel 3 together with the sliding member 4 is displaced and together therewith also the pressure bar 16 which in its turn displaces the piston 12 in the direction toward the hydraulic accumulator 14. As a result thereof an increase in the pressure of the oil is brought about, which increase in pressure acts upon the hydraulic accumulator 14 (FIG. 3) and through line 31 eventually closes check valve 30 and is through line 32a conveyed to pressure limiting valve 32 which is set for a higher pressure than pressure limiting valve 26. Consequently, valve 32 opens and fluid escapes to reservoir 34 until the excess pressure has been relieved and valve 32 closes again.

The displacement of the guide wheel 3 on the guiding rails 4a absorbed by the hydraulic system while an increased but constant pressure prevails in the hydraulic system, is also effected after the spring dish 20 has engaged the abutment 23. If the displacement of the guide wheel is still greater, the spring dish 20 engages the fixed abutment 23 and the springs 19, 19a make possible a further yield. As soon as the foreign body leaves the system, first the springs 19 and 19a relax and move the guide wheel 3 over the guiding rail 4a in a direction opposite to that of the tensioning device. Simultaneously, the accumulator 14 empties so that the pressure in the cylinder chamber 35 drops to the desired or preset value and valve 30 opens again. Consequently, pump 24 becomes active through the control valve 28 and supplements the lost quantity until the preset pretensioning pressure has again been restored. As soon as the chain has worn, in view of the hydraulic device an automatic tensioning of the chain is effected to which end the pressure prevailing in the cylinder chamber 35 and supplemented by the hydraulic accumulator 14 displaces by means of the piston 12 and pressure bar 16 the guide wheel 3 on the guiding rail 4a until the piston 12 in its maximum position has its edge 11 engage the abutment 10 on cover 9.

As will be evident from the above, the mechanical springs become effective only when the piston in the cylinder has reached its maximum stroke so that the spring system will become active successively in the following steps:

1. The pressure medium is received in the hydraulic accumulator;
2. Displacement of the oil under pressure from the cylinder chamber into the container for the oil under pressure;
3. Stroke of the mechanical spring.

The advantages obtained by means of the present invention consist primarily in that the mechanical spring which follows the hydraulic system is not under a preload so that at a predetermined spring stroke will be able to absorb also higher outer loads, and on the other hand the spring stroke will not be so great that the chain springs off even when the tracklaying vehicle moves over steep inclines, especially when the drive wheel is located in front when viewing in the driving direction. The device according to the invention has the further advantage that the pressure stress prevailing in the hydraulic system is taken advantage of for preloading the entire spring system. Consequently, with the same predetermined spring strokes or when absorbing the same outer forces, the expenditure for the device according to the present invention, especially with regard to the mechanical springs is considerably lower than with heretofore known devices involved. On the other hand, the present invention makes it possible to obtain spring strokes and absorb loads which could not be absorbed with heretofore known devices.

It is, of course, to be understood that the present invention is, by no means, limited to the particular showing in the drawings, but also comprises any modifications within the scope of the appended claims.

What I claim is:

1. In combination with a tracklaying vehicle having tracklaying chain means, a hydraulically operable chain tensioning device which includes: frame means, wheel means displaceably mounted in said frame means for tensioning engagement with said chain means, hydraulically operable power means supported by said frame means and including a reciprocable piston rod, pushrod means interposed between said piston rod and said wheel means for conveying pressure from said hydraulically operable power means to said wheel means and through the latter onto said chain means and vice versa, abutment means stationarily arranged with regard to said frame means and located between said guide wheel means and said piston rod while having a passage therethrough for said pushrod means and said piston rod, spring dish means movably surrounding said pushrod means and arranged between said abutment means and said wheel means, resilient means interposed between said spring dish means and said wheel means, said spring dish means having an outer diameter exceeding the outer diameter of said passage means, accumulator means operatively connected to said hydraulically operable power means, pressure fluid supplying means operable to supply pressure fluid to said hydraulically operable power means and said accumulator to maintain a desired pressure therein, and pressure-limiting valve means therein, and pressure-limiting valve means associated with said hydraulically operable power means for relieving pressure therefrom in excess of said desired pressure.

2. An arrangement according to claim 1, in which said resilient means includes an outer spring of larger wire diameter and an inner spring of smaller wire diameter, at least one of said two springs normally being under substantially no preload.

3. An arrangement according to claim 1, which includes a pump forming said pressure fluid supply means, conduit means leading from said pump to said hydraulically operable power means, two check valves interposed in series arrangement in said conduit means, a fluid reservoir, and two pressure-limiting valves hydraulically connected to said pump and said hydraulically operable power means while bypassing said two check valves, and means for connecting the outlet of said check valves to said fluid reservoir.

4. An arrangement according to claim 1, in which that check valve which is closest to said pressure fluid operable power means forms a filling valve operable to be closed in response to the establishment of a desired preset pressure in said hydraulically operable power means, one of said pressure-limiting valves being operable in response to a pressure exceeding the said desired preset pressure to connect said fluid-operable power means to an exhaust.

5. An arrangement according to claim 1, in which that end of said push rod which is adjacent said piston rod has a threaded portion, and which includes a cap nut threadedly connected to said threaded portion and being in abutting engagement with said piston rod.

6. An arrangement according to claim 1, in which said frame means include rail means, and in which slide means are provided carrying said wheel means and being slidable on said rail means, said slide means being connected to said push rod means and being engaged by said resilient means.

* * * * *